(12) United States Patent
Cha et al.

(10) Patent No.: US 11,704,578 B2
(45) Date of Patent: Jul. 18, 2023

(54) MACHINE LEARNING METHOD, APPARATUS, AND COMPUTER PROGRAM FOR PROVIDING PERSONALIZED EDUCATIONAL CONTENT BASED ON LEARNING EFFICIENCY

(71) Applicant: RIIID INC., Seoul (KR)

(72) Inventors: Yeong Min Cha, Gyeonggi-do (KR); Dong Min Shin, Seoul (KR); Jae Min Lee, Seoul (KR); Young Ku Lee, Seoul (KR); Jae We Heo, Seoul (KR)

(73) Assignee: RIIID INC.

( * ) Notice: Subject to any disclaimer, the term of this patent is extended or adjusted under 35 U.S.C. 154(b) by 446 days.

(21) Appl. No.: 16/626,835

(22) PCT Filed: Oct. 16, 2019

(86) PCT No.: PCT/KR2019/013590
§ 371 (c)(1),
(2) Date: Dec. 26, 2019

(87) PCT Pub. No.: WO2020/080826
PCT Pub. Date: Apr. 23, 2020

(65) Prior Publication Data
US 2021/0133598 A1 May 6, 2021

(30) Foreign Application Priority Data
Oct. 16, 2018 (KR) .................. 10-2018-0123240

(51) Int. Cl.
*G06N 20/00* (2019.01)
*G09B 7/06* (2006.01)
*G06N 5/04* (2023.01)

(52) U.S. Cl.
CPC .............. *G06N 5/04* (2013.01); *G06N 20/00* (2019.01); *G09B 7/06* (2013.01)

(58) Field of Classification Search
CPC .... G06F 16/23; G06F 16/2379; G06F 16/335; G06F 16/9027; G06F 16/9535;
(Continued)

(56) References Cited

U.S. PATENT DOCUMENTS

2003/0190592 A1* 10/2003 Bruno ............... G09B 7/06
434/322
2005/0256663 A1* 11/2005 Fujimori ............ G09B 19/06
702/121

(Continued)

FOREIGN PATENT DOCUMENTS

| JP | 2006-072122 A | 3/2006 |
| JP | 2017-068189 A | 4/2017 |

(Continued)

OTHER PUBLICATIONS

Office Action from Japanese App. No. 2019-570009 dated Mar. 8, 2021 (with English translation).

*Primary Examiner* — Milap Shah
(74) *Attorney, Agent, or Firm* — Adsero IP (57) ABSTRACT

Disclosed herein is a method of providing user-customized learning content in a service server, which includes a) for a specific subject, configuring a problem database including at least one of multiple-choice problems each including at least one example, providing the problem to user devices, and collecting example selection data of users for the problem from the user devices, b) estimating a probability of right answer to the problem for each of the users using the example selection data of each of the users, and assuming that any user selects an example of any problem, calculating, for each problem, a change rate of probabilities of right answer to all problems contained in the problem database for the user, and sorting the problems contained in the problem database in the order of the high change rate to recommend them to the user.

6 Claims, 3 Drawing Sheets

(58) Field of Classification Search
CPC ........ G06Q 50/10; G06Q 30/02; G06N 20/00;
G06N 7/005
See application file for complete search history.

(56) References Cited

U.S. PATENT DOCUMENTS

| | | | | |
|---|---|---|---|---|
| 2007/0269788 | A1* | 11/2007 | Flowers | G09B 7/00 434/350 |
| 2014/0279727 | A1* | 9/2014 | Baraniuk | G09B 7/00 706/11 |
| 2016/0048772 | A1* | 2/2016 | Bruno | G06N 5/04 706/11 |
| 2016/0132773 | A1* | 5/2016 | Chandrasekaran | G06F 16/9032 706/11 |
| 2016/0180150 | A1* | 6/2016 | Negi | G06V 40/45 382/118 |
| 2016/0180725 | A1* | 6/2016 | Fang | G09B 7/00 434/322 |
| 2016/0217472 | A1* | 7/2016 | Podgorny | G06Q 40/123 |
| 2016/0217701 | A1* | 7/2016 | Brown | G09B 7/00 |
| 2018/0060744 | A1* | 3/2018 | Achin | G06N 5/04 |
| 2018/0336792 | A1* | 11/2018 | Cha | G09B 5/065 |
| 2019/0325773 | A1* | 10/2019 | Cho | G09B 5/12 |
| 2020/0193317 | A1* | 6/2020 | Cha | G06N 20/00 |

FOREIGN PATENT DOCUMENTS

| | | |
|---|---|---|
| KR | 20100022427 | 3/2010 |
| KR | 20130037541 | 4/2013 |
| KR | 101285127 | 7/2013 |
| KR | 101285217 | 7/2013 |
| KR | 10-2017-0034106 | 3/2017 |
| KR | 101853091 | 4/2018 |
| KR | 101895963 | 10/2018 |

* cited by examiner

FIG. 3

MACHINE LEARNING METHOD, APPARATUS, AND COMPUTER PROGRAM FOR PROVIDING PERSONALIZED EDUCATIONAL CONTENT BASED ON LEARNING EFFICIENCY

CROSS-REFERENCE TO RELATED APPLICATION

This application claims priority to and is a 35 U.S.C. § 371 national phase application of PCT/KR2019/013590, filed on Oct. 16, 2019, entitled "MACHINE LEARNING METHOD, APPARATUS, AND COMPUTER PROGRAM FOR PROVIDING PERSONALIZED EDUCATIONAL CONTENT BASED ON LEARNING EFFICIENCY", which application claims priority to and the benefit of Korea Patent Application No. 10-2018-0123240, filed Oct. 16, 2018, the disclosures of which are incorporated herein by reference in their entirety.

TECHNICAL FIELD

The present invention relates to a method of providing user-customized content based on data. More specifically, the present invention relates to a method of estimating learning efficiency of a user in a problem by applying collected problem-solving result data to a machine learning framework to recommend educational content based on the same.

BACKGROUND ART

Educational content has generally been provided in a package till now. For example, a workbook on paper contains at least 700 problems per book, and online or offline lectures are also sold at a time with a minimum of one month's worth of study in one to two hours.

However, for students being educated, there is a need for personalized content rather than packages because both individual vulnerable units and vulnerable problem types are different. For the most efficient learning in a limited time, learning by selecting the most efficient problem is much more efficient than solving the full 700 problems in the workbook.

However, it is very difficult for students who are trainees being educated to pick out problems that are appropriate for themselves. Furthermore, in the conventional education industry such as academies or publishing companies, it is not easy to provide optimized problems for individual students because students and problems are analyzed based on the subjective experience and intuition thereof.

As such, in the conventional education environment, it is not easy for trainees to provide personalized content that can produce the most efficient learning results, and students quickly lose their sense of accomplishment and interest in the education content that is uniformly provided.

SUMMARY OF INVENTION

Technical Problem

An object of the present invention is to solve the above-mentioned problems. More specifically, the present invention provides a method of analyzing users and/or problems based on large amounts of problem-solving result data, and of calculating problem-specific learning efficiency of each user based thereon to recommend learning content according to the learning efficiency.

Solution to Problem

In accordance with an aspect of the present invention, there is provided a method of providing user-customized learning content in a service server, which includes a) for a specific subject, configuring a problem database including at least one of multiple-choice problems each including at least one example, providing the problem to user devices, and collecting example selection data of users for the problem from the user devices, b) estimating a probability of right answer to the problem for each of the users using the example selection data of each of the users, and assuming that any user selects an example of any problem, calculating, for each problem, a change rate of probabilities of right answer to all problems contained in the problem database for the user, and sorting the problems contained in the problem database in the order of the high change rate to recommend them to the user.

Advantageous Effects of Invention

In accordance with exemplary embodiments of the present invention, it is possible to provide optimized learning content for a user based on user and/or problem analysis results, and thus to maximize the learning effect of the user.

DESCRIPTION OF EMBODIMENTS

It is apparent that the present invention is not limited to the description of the embodiments disclosed below and various modifications may be made without departing from the technical scope of the present invention. In describing the embodiments, technical descriptions that are well known in the art to which the present invention pertains and are not directly related to the subject matter of the present invention will be omitted.

In the drawings, like reference numerals are used to indicate the same or like components. Also, some components may be exaggerated, omitted, or schematically illustrated in the accompanying drawings. This is to clarify the subject matter of the present invention by omitting unnecessary explanation irrelevant thereto.

With the spread of IT devices in recent years, data collection for user analysis has become easier. If user data can be sufficiently collected, it is possible to more precisely analyze a user and to provide the most suitable content for the user.

With this trend, there is a high need for providing user-customized educational content, especially in the education industry.

As a simple example, when a user has a poor understanding of the "verb tense" in the subject of English, the learning efficiency of the user will be further increased if a problem involving the concept of the "verb tense" can be recommended. However, in order to provide such user-customized educational content, it is necessary to precisely analyze individual contents and users.

Conventionally, in order to analyze contents and users, an expert manually defines the concepts of a relevant subject and individually determines what concepts each problem in the subject has to tag the same. Then, based on the result of solving the tagged problems for a specific concept by each user, the skill of the user (learner) is analyzed.

In the course of solving a problem by a user, an examiner may have one or two intentions, but there may be dozens of reasons why the user misses the problem. For example, it may be assumed that a type of problem is the "subjunctive past" and the intention of the examiner is "can you distinguish between the past tense of auxiliary verbs and the subjunctive?"

In this case, the reason why the user misses the problem may be that "the user cannot distinguish between the past tense of auxiliary verbs and the subjunctive" as the examiner is intended, but may be because the user does not know a specific word on the print. In the latter case, the most efficient method for the user will be to learn the word.

However, it is not possible for the expert to analyze the user in consideration of all cases. Therefore, it is generally determined that the user need to learn concepts such as "subjunctive past", "past tense of auxiliary verbs", and "subjunctive" according to the problem type tag and the examiner's intended tag, and the problems related thereto will be recommended.

As such, the method of analyzing the user based on the tag information predefined by the expert is problematic in that the tag information depends on the human subjectivity and does not cover various cases of human behavior. Since the tag information generated mathematically without the intervention of the human subjectivity is not mathematically assigned to a problem, the resulting data is not high in reliability.

Accordingly, a data analysis server according to an embodiment of the present invention is to apply a machine learning framework to learning data analysis to exclude human intervention in a data processing process.

According to this, it is possible to analyze a user and a problem based on the problem-solving result log of the user without defining the concept of a relevant subject in advance (i.e., without generating tag information on the concept included in the problem). For example, the data analysis server may collect user's problem-solving result logs, construct a multidimensional space consisting of users and problems, and assign a value to the multidimensional space based on whether the users correct or miss the problems, thereby modeling the user and/or the problems by calculating a vector for each user and problem.

In this case, the user model may include information about the characteristics of each user for all problems, and the problem model may include information about the characteristics of each problem for all users.

Furthermore, the problem model may be represented as a construct of the concept of constructing the subject of a specific problem, and the user model may be represented as an understanding of the concept of constructing the subject of a specific user.

Furthermore, according to an embodiment of the present invention, it is possible to calculate a probability that any user selects a right example for any problem, namely, a user's probability of right answer to each problem, using the problem model and the user model. In this case, it should be noted that what attributes or features the user vector and the problem vector include cannot be interpreted in a limited manner in the present invention.

For example, according to an embodiment of the present invention, the user vector may include a degree to which the user understands an arbitrary concept, that is, an understanding of the concept. Furthermore, the problem vector may include whether the problem is composed of certain concepts, that is, a conceptual construct.

Furthermore, according to an embodiment of the present invention, learning efficiency may be calculated for each of the problems included in the problem database for a specific user, so that the problems may be recommended to the user in the order of high learning efficiency.

For example, according to a first embodiment of the present invention, it may be assumed that a problem with a low probability of right answer is high in learning efficiency. According to this, since a specific user already understands, a problem to be correct is excluded and only problems to be missed will be selected and recommended. According to the above embodiment, the user may first learn the problem that is sure to be missed.

According to a second embodiment of the present invention, when a user corrects a certain problem, it may be assumed that a problem having a high rate of increase in the probability of right answer for the user of all the problems predicted by a newly learned model including a relevant problem is high in learning efficiency. According to this, a problem will be recommended to the user to solve the entire problem database better. According to this, the user will first learn the problem that may increase the probability of right answer to all problems.

Furthermore, according to a third embodiment of the present invention, it may be assumed that a problem that may increase a user's actual test score is high in learning efficiency. According to this, by estimating an actual test score of a problem that is external to the problem database of the same subject for each user, and a problem that may increase the actual test score will be recommended. According to this, the user will first learn the problem that may increase the actual test score.

Figure 1:
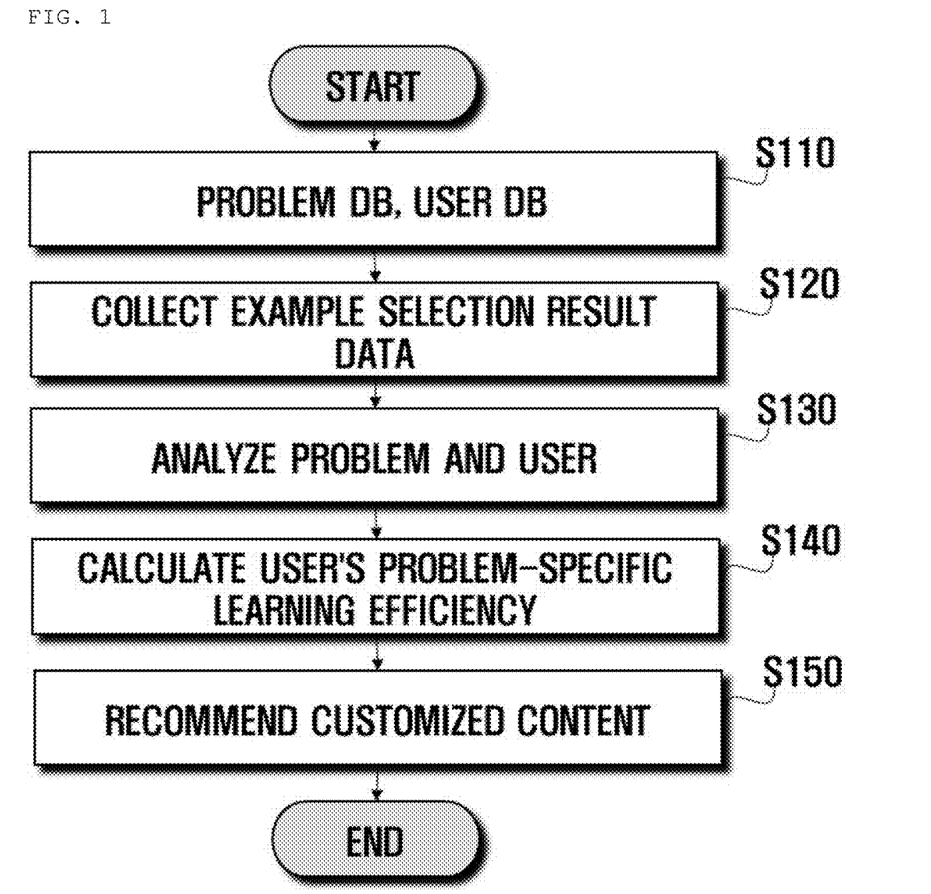
FIG. 1 is a flowchart illustrating a process of recommending user-customized content according to an embodiment of the present invention.

FIG. 1 is a flowchart illustrating a process of recommending user-customized content according to an embodiment of the present invention.

Steps 110 and 130 are steps of collecting learning data in a data analysis system according to an embodiment of the present invention and modeling problems and users.

In step 110, a data analysis server may create a problem database and a user database.

For example, the data analysis server may create a problem database by collecting various problems on the market. The problems may include listening test problems and may be in the form of text, images, audio, and/or video. In addition, the data analysis server may create a user database including user identification information.

In step 120, the data analysis server may provide the problem database to a user device and collect result data obtained by solving a relevant problem by a user.

In this case, the data analysis server may list the collected problem-solving result data on users, problems, and results. For example, $Y(u, i)$ may refer to the result that a user u solves a problem i, and a value of 1 may be given for the right answer and a value of 0 may be given for the wrong answer.

Furthermore, the data analysis server according to the embodiment of the present invention may construct a multidimensional space consisting of users and problems, and assign a value to the multidimensional space based on whether the users correct or miss the problems, thereby calculating a vector for each user and problem. In this case, it should be interpreted that the features included in the user vector and the problem vector are not specified (step 130).

For example, the data analysis server according to the embodiment of the present invention may estimate a user's conceptual understanding L and a problem's conceptual construct R from Y without defining the concept separately if Y is sufficient in size. In this case, according to the embodiment of the present invention, each element of L may have a value between 0 and 1, and the sum of elements of each row of R may be 1.

For example, if the value of the first row of L is [0, 0, 1, 0.5, 1], it will be interpreted that a first user does not understand first and second concepts at all, fully understands third and fifth concepts, and understands a fourth concept by half.

For example, if the value of the first row of R is [0, 0.2, 0.5, 0.3, 0], it will be interpreted that a first problem includes about 20% of the second concept, about 50% of the third concept, and about 30% of the fourth concept.

Meanwhile, the data analysis system according to the embodiment of the present invention may mathematically connect correlations between users and problems through a low coefficient matrix if L and R are estimated with sufficient reliability.

For example, assuming that the number of unknown concepts constituting a relevant subject is r when the total number of users to be analyzed is n and the total number of problems to be analyzed is m, a service server may define a user's conceptual understanding matrix L as an n by r matrix, and define a problem's conceptual construct matrix R as an m by r matrix. In this case, when L is connected to the transposed matrix $R^T$ of R, the correlations between users and problems may be analyzed without defining a concept or the number of concepts separately.

When applied, in the above example in which the value of the first row of L is [0, 0, 1, 0.5, 1] and the value of the first row of R is [0, 0.2, 0.5, 0.3, 0], the first user's understanding of first problem X(1,1) may be calculated by X(1,1)=0.5−0.5*0.3=0.65. That is, the first user may be estimated to understand 65% of the first problem.

However, the understanding of a specific problem and the probability of correcting a specific problem by the user may not be the same as each other. In the above example, if the first user understands 65% of the first problem, what is the probability that the first problem is right when it is actually solved?

To this end, the present invention introduces the methodology of item response theory used in psychology, cognitive science, pedagogy, or the like. The item response theory is a test theory used to measure subject's characteristics, for example, cognitive ability, physical ability, skill, knowledge, attitude, personality traits, or assessment item difficulty, using responses to assessment items.

As a result of experiment using sufficiently large data by applying the above theory thereto, it is analyzed that a problem understanding X and a problem-correcting probability P are not linear. Experimenting with the problem understanding X and the problem-correcting probability P using sufficiently large data may result in a two-dimensional graph. By calculating the function that may explain this using a conventional mathematical method, a function Φ for estimating the user's problem-correcting probability P may be derived as indicated in Equation 1 below. In other words, the problem-correcting probability P may be calculated by applying the problem understanding X to the function Φ.

$$\Phi(x) = 0.25 + \frac{0.75}{1 + e^{-10(x-0.5)}} \quad \text{[Equation 1]}$$

In the above example in which the first user's understanding of first problem is 65%, the probability that the first user corrects the first problem is calculated by P(1,1)=Φ(X(1,1))=0.8632 to be 86%. That is, in the case where the first user does not understand the second and fourth concepts at all and fully understands the third concept and the first problem is composed of 20% of the second concept, 50% of the third concept, and 30% of the fourth concept, according to the above Equation, it may be estimated that the probability that the first problem is right when the user solves it is 86%.

Meanwhile, the method illustrated below may be followed to estimate the user's conceptual understanding L and the problem's conceptual construct R. This is a method for estimating a conceptual understanding $L_i$ of a user i and a conceptual construct $R_j$ of a problem j, based on a stochastic gradient algorithm, which is merely by way of example and the present invention is not limited thereto.

The data analysis system according to the embodiment of the present invention may assign initial values of the conceptual understanding $L_i$ of the user i and the conceptual construct $R_j$ of the problem j, as any values. For example, the data analysis system may assign an initial value of any conceptual understanding $L_i$ of the user i and an initial value of any conceptual construct $R_j$ of the problem j, as any values between 0 and 1.

Furthermore, the problem-solving result data may be listed by setting val such that the right answer is 1 and the wrong answer is 0, for each user i and each problem j. For example, the user-specific problem-solving result data set may be converted into a list set such that the right answer is (i, j, 1) and the wrong answer is (i, j, 0) when the user i solves the problem j.

Then, the data analysis system may randomly load the data of the problem-solving result list one by one. More specifically, the data analysis system may calculate a temporary value tmp of the probability $P_{(i,j)}$ that a specific user i corrects a specific problem j by applying the conceptual understanding $L_i$ of the user i and the conceptual construct $R_j$ of the problem j at that time.

This is to update L and R using the difference between the probability $P_{(i,j)}$ calculated by applying the conceptual understanding $L_i$ of the user i and the conceptual construct $R_j$ of the problem j at that time, that is, the probability that a specific user i corrects a specific problem j, and val (1 if right and 0 if wrong) that is the result value obtained by actually solving the problem j by the user i.

If the selected data is (i, j, val), the data analysis system may calculate the following temporary value tmp of the probability $P_{(i,j)}$ that the user i corrects the problem j using $L_i$ (the conceptual understanding of the user i) and $R_j$ (the conceptual construct of the problem j) at that time:

$$tmp = \Phi(x(i,j)) = \Phi(L_i R_j^T)).$$

For example, if the selected data is (1, 1, 0), it means that the first user solved the problem and missed it. However, if the result calculated using $L_i$ and $R_j$ at that time is that the probability that the first problem is right when the first user solves it is 86%, namely, P=0.86, it is necessary to update $L_1$ and $R_1$ by reflecting the data (1, 1, 0) thereto.

To this end, the data analysis system according to the embodiment of the present invention may calculate an approximate gradient grad for the selected data (i, j, val) using the difference between the temporary value tmp of the probability that the user i corrects the problem j and val that is data obtained by actually solving the problem j by the user i. This may be calculated using Equation 2 below.

$$\mathrm{grad}=10(val-tmp)/\{tmp\times(1+e^{-10(L_i R_j^T - 0.5)})\} \qquad \text{[Equation 2]}$$

Furthermore, it is possible to update the conceptual understanding $L_i$ of the user i and the conceptual construct $R_j$ of the problem j according to the following Equation 3 by reflecting the number of user-solved problems $u_i$ and the number of solved problems $v_j$ together with grad.

$$L_i:(1-mu\times\mathrm{step}/u_i)\times L_i-\mathrm{step}\times\mathrm{grad}\times R_j$$

$$R_j:(1-mu\times\mathrm{step}/v_j)\times R_j-\mathrm{stop}\times\mathrm{grad}\times L_i \qquad \text{[Equation 3]}$$

In this case, "mu" is a parameter that determines the performance of the Equation and may be selected by the experiment according to the prior art, and "step" may be selected by the experiment according to the prior art as a parameter for the speed at which the Equation receives new data.

According to the embodiment of the present invention, when this process is repeated for the entire data and all types of data are reflected, L and R may be reliably estimated by randomly mixing the list again and sufficiently repeating the process.

However, in a data analysis framework according to the embodiment of the present invention, the reason why users and problems are represented as a modeling vector is to precisely predict whether a specific user will correct or miss a specific problem.

The user's rate of right answer to a problem may be estimated by collecting and analyzing the user's right/wrong answer result as described above, but may also be estimated using an example selection probability.

For example, if the example selection probability of a first user for a specific problem is (0.1, 0.2, 0, 0.7), it may be predicted that the user will select an example 4 with a high probability, and if the right answer to the problem is example 4, the probability that the first user corrects the problem may be predicted to be high.

Meanwhile, the problem difficulty may be estimated by collecting and analyzing the right/wrong answer results of all users, but may also be estimated using an example selection probability.

For example, if the example selection probability of users for a specific four-choice problem is (0.5, 0.1, 0.3, 0.6), the probability that the users select an example 1 in the second problem is similar to the probability that the users select an example 4 in the second problem. Therefore, the second problem may be classified as having a high difficulty.

To this end, the data analysis server may collect all problems and solving result data for all users, including the example elements selected by the users.

More specifically, the data analysis server may collect solving result logs by collecting example selection results for whether a user selects a certain example in a relevant problem among all problems included in the problem database, and may further collect the right/wrong answer result of the problem. In this case, the data analysis server may list users, problems, and examples selected from relevant problems by relevant users.

Then, the data analysis server may extend one problem to example units to perform data analysis processing.

For example, if the problem i is a four-choice problem, the problem i may extend to four variables of (i, 1)(i, 2)(i, 3)(i, 4), and a value may be assigned to whether each user selects each problem-example.

For example, E(i, j) refers to an example j of a problem i, and Y'(u, E) refers to whether a user u selects the example j of the problem i, in which case, according to the embodiment of the present invention, a value of 1 if selected and a value of 0 if not selected may be assigned.

Furthermore, the data analysis server may construct a multidimensional space using users and problem-examples as variables and assign a value to the multidimensional space based on whether the users select the problem-examples, thereby calculating a vector for each user and problem-example.

Then, the data analysis server may estimate a probability that any user selects any problem-example, i.e., a selectivity, using the user vector and the problem-example vector.

In this case, the selectivity may be estimated by applying various algorithms to the user vector and the problem-example vector, and the algorithm for calculating the selectivity is not limited in interpreting the present invention.

For example, according to the embodiment of the present invention, the user's problem-example selectivity may be estimated by applying a sigmoid function such as Equation 4 below (x is a problem-example vector and θ is a user vector).

$$h\theta(x)=1/(1+e^{(-\theta*T*X)}) \qquad \text{[Equation 4]}$$

Furthermore, the data analysis server according to the embodiment of the present invention may estimate a rate of right answer to a problem using a user's example selectivity.

However, for example, if the specific user's example selection probability for a specific four-choice problem is (0.5, 0.1, 0.3, 0.6) and the right example is 1, it matters what is the probability that the user corrects the problem. That is, it is possible to consider a method of estimating the rate of right answer to the problem using a plurality of example selectivities for the problem.

According to the embodiment of the present invention, in order to simply restore the example selectivity to the rate of right answer to a problem, a method of comparing a right example selectivity to an entire example selectivity may be considered.

In this case, in the previous example, the user's rate of right answer to the problem will be calculated as 0.5/(0.5+0.1+0.3+0.6). However, when a user solves a problem, the user does not understand the problem by dividing it into example units, but understands it as a problem unit by including the configuration of the entire example and the intention of the problem. Therefore, the example selectivity and the rate of right answer may not be simply connected to each other.

Accordingly, according to the embodiment of the present invention, it is possible to estimate the rate of right answer to the problem from the example selectivity by averaging the entire example selectivity of the problem and applying the averaged selectivity of the right example to the selectivity of the entire example.

In the previous example, if the selection probability of the example is (0.5, 0.1, 0.3, 0.6), averaging it over the entire example may cause each example selectivity to be changed to (0.33, 0.07, 0.20, 0.41) in scale. If the right example is 1, the averaged selectivity of the example 1 is 0.33 so that the user's rate of right answer to the problem may be estimated as 33%.

Furthermore, the service server according to the embodiment of the present invention may estimate the rate of right answer to the problem using the problem-example selection probability of the user, thereby estimating the user's understanding of a specific concept.

Furthermore, the data analysis server may calculate a relevant user's learning efficiency in a specific problem based on the problem model and the user model (step 140).

As described above, the data analysis server according to the embodiment of the present invention may calculate a probability that each user selects an example unit of a problem and a probability that the user corrects a problem unit, using the model of the example unit of the problem and the user model.

According to the first embodiment of the present invention, it may be assumed that a problem with a low probability of right answer is high in learning efficiency. According to this, the service server will determine that a user already understands a problem with a high probability of right answer, to exclude a problem to be corrected by the user and to select and recommend only problems to be missed by the user.

More specifically, the service server may exclude a problem that a user has already solved in the problem database set, and may sort the remaining problems in the order of a low rate of right answer for a specific user to list recommended problems and provide it for the user (step 150).

For example, if the value of the first row of the user's problem-correcting rate P is [0.3, 0.4, 0.1, 0.9, 0.7], the probability that user 1 corrects problems 1, 2, 3, 4, and 5 will be interpreted as being 30%, 40%, 10%, 90%, and 70%, respectively. The service server may provide the user with a problem recommendation list prioritized in the order of problems 3, 1, 2, 5, and 4. In this case, if user 1 has already solved problem 5, the service server may prepare a problem recommendation list except for problem 5.

According to the above embodiment, the service server may sort the problems included in the problem database in the order of low user right probability and recommend them to the user. The user will first learn the problem that is sure to miss.

Meanwhile, the data analysis server may recommend user-customized content using at least one of a user vector, a problem-example vector, an example selectivity, a rate of right answer to a problem, a user's conceptual understanding, and a problem's conceptual construct (step 150).

For example, the service server may recommend an advanced course on a specific concept to a user having a low understanding of the concept. As another example, the service server may recommend a problem configured to include a plurality of concepts to a user having a low rate of right answer to the problem including all the plurality of concepts.

Meanwhile, according to a second embodiment of the present invention, it may be assumed that, when a user corrects a certain problem, a problem with a high rate of change of the probability that the user corrects all problems is high in learning efficiency. According to this, the user will be recommended for a problem allowing for solving the entire problem database better, and will first learn a problem that may increase the probability of right answer to the entire problem.

Figure 2:
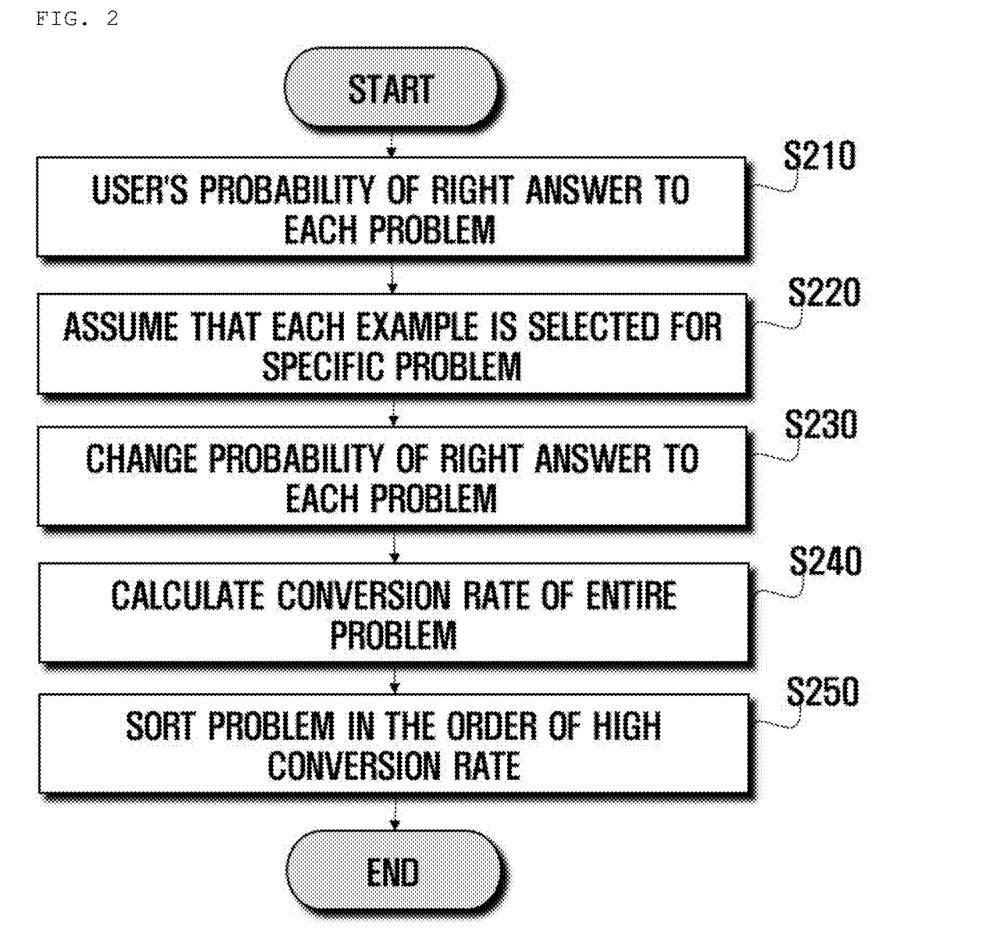
FIG. 2 is a flowchart illustrating a process of calculating user's problem-specific learning efficiency according to an embodiment of the present invention.

The process of calculating user's problem-specific learning efficiency according to the second embodiment will be described later with reference to FIG. 2. FIG. 2 is a flowchart illustrating the process of calculating user's problem-specific learning efficiency according to the embodiment of the present invention.

When the solving result data of a user is additionally collected, the collected data will be reflected to update a probability that the user corrects each problem at any point in time and a probability of selection of each example of any problem. In view of this point, assuming that the user selects a right example of any problem included in the problem database for a specific problem, the probability that the user corrects other problems will be changed slightly (steps 210 to 230).

Then, the service server may assume that the user selects a right example of each of the problems included in the entire problem database, calculate an increased value of the probability of right answer to each of other problems, and calculate the total of the change values of the right probability or the average of the change values of the right probability as learning efficiency in the problem (step 240).

More specifically, the data analysis server according to the embodiment of the present invention may apply, to the probability that a specific user selects a certain example of any problem, the average of the change values of the rate of right answer to another problem when the user selects the example, to calculate learning efficiency in the problem.

For example, it may be considered that the user A's selectivities of first, second, third, and fourth examples of specific problem a are a1, a2, a3, and a4, respectively.

In this case, assuming that user A selects the first example of that problem, the user A's model and the model of all problems will be changed somewhat with application of a user A's first example selection event and the rate of right answer to each problem will be changed slightly depending on the changed model.

Accordingly, the data analysis server may apply a virtual event to the user A's first example selection to calculate an average of the change values of the rate of right answer to all problems AVC_a1.

In the same way, the data analysis server may calculate AVC_a2 assuming that user A selects a second example, calculate AVC_a3 assuming that user A selects a third example, and calculate AVC_a4 assuming that user A selects a fourth example.

Then, the data analysis server may calculate a user A's learning efficiency in problem a E(A, a) through the following Equation.

$$E(A,a)=a1*AVC\_a1+a2*AVC\_a2+a3*AVC\_a3+a4*AVC\_a4 \qquad \text{[Equation 5]}$$

Furthermore, the data analysis server may calculate E(A) for the entire problem and use E(A) as learning efficiency in the problem.

Then, the service server may sort all problems in the order of learning efficiency. That is, when the user learns and corrects the problem, the probability of right answer to all other problems is changed, in which case, if the change value of the right probability is high, the user may solve the entire problem database better to determine that the learning efficiency is high, thereby recommending it to the user (step 250).

Meanwhile, according to a third embodiment of the present invention, it may be assumed that a problem that may increase a user's actual test score will be high in learning efficiency. According to this, by estimating an actual test score of a problem that is external to the problem database of the same subject for each user, and a problem that may increase the actual test score will be recommended. According to this, the user will first learn the problem that may increase the actual test score.

Figure 3:
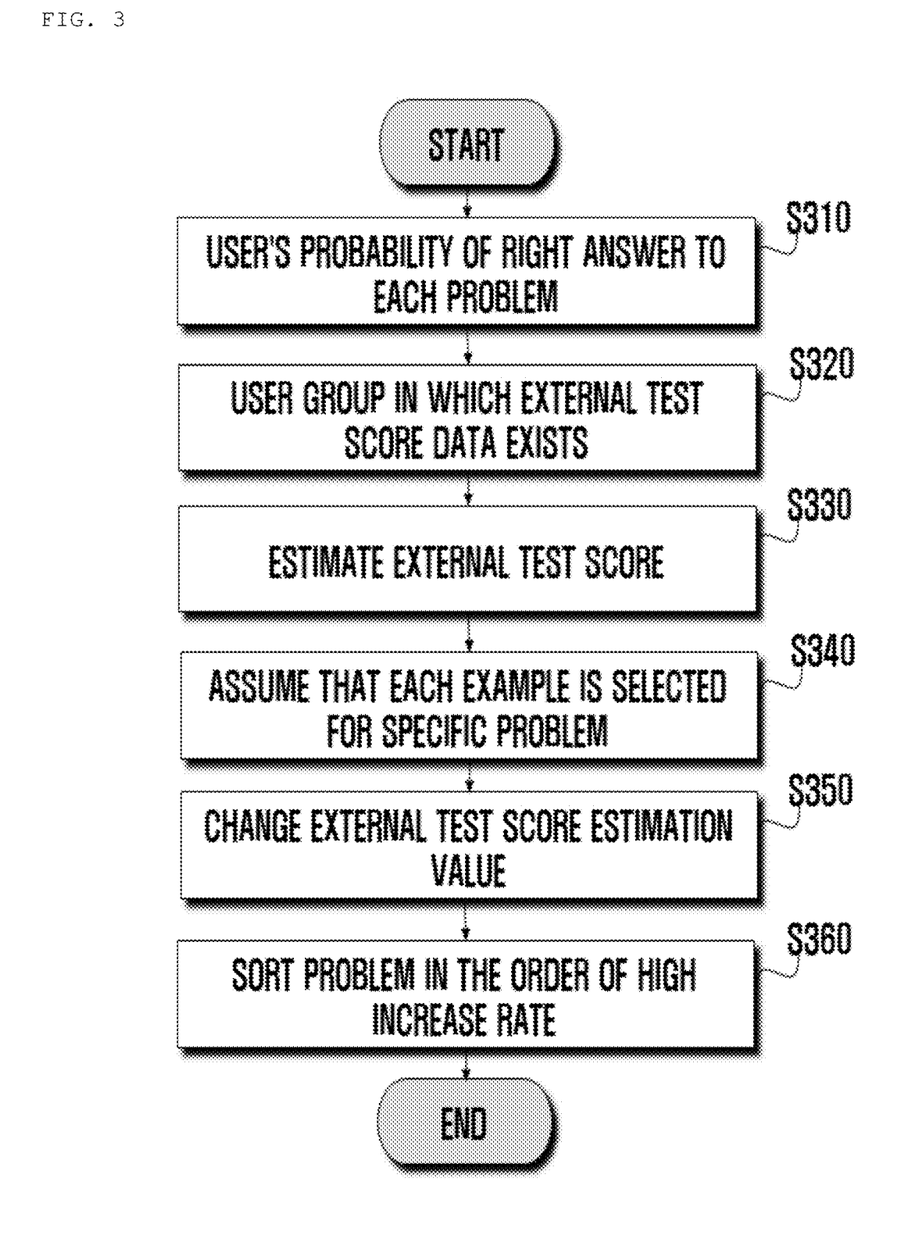
FIG. 3 is a flowchart illustrating a process of calculating user's problem-specific learning efficiency according to another embodiment of the present invention.

The process of calculating user's problem-specific learning efficiency according to the third embodiment will be described later with reference to FIG. 3. FIG. 3 is a flowchart illustrating the process of calculating problem-specific learning efficiency that may increase the actual test score according to the third embodiment of the present invention.

According to the above embodiment, the process of estimating the actual test score using the problem model and the user model is necessarily required. How do you estimate the actual test score on the problem that is external to the problem database?

Conventionally, the subject's expected score of a specific test was generally estimated based on the expert's know-how. For example, in the case of the college scholastic ability test, the mock test is configured similarly to the actual college scholastic ability test according to the expert's know-how, and the score of the college scholastic ability test is predicted based on the result of taking the mock test by students.

However, since this method often relies on the subjective experiences and intuitions of experts, the case where it is much different from the actual test result is not uncommon. Since the experts design the mock test based on their own experience and intuition, the mock test may not accurately predict students' skills or accurately predict actual test scores.

Furthermore, the practice of taking the mock test by examinees is not an efficient study. Since the mock test is configured based on the similarity between the actual test and the problem type, the mock test is irrelevant to the skills of examinees. That is, the mock test aims at estimating test scores to identify the examinee's own position from among all the students, and is not a test designed for the examinee's learning. Moreover, the mock test will be no better way to improve learning efficiency.

According to the embodiment of the present invention for solving this issue, using actual test score data of a user group in which the actual test score data exists, problems may be recommended that are external to the problem database, estimate the actual test score, and are required to increase the value of actual test score estimation.

More specifically, according to the embodiment of the present invention, using the actual test score data of the user group (step 320), a modeling function that represents the relationship between the average of the probabilities of right answer to all problems included in the problem database of the user group and the actual test score may be calculated for each user. That is, it is possible to calculate a modeling function for converting the average of the probabilities of right answer to all problems into the actual score using the actual test score data (a more specific method of calculating the modeling function will be described later).

When the modeling function is calculated, the average of the probabilities of right answer to all questions included in the problem database of a user who does not belong to the user group, that is, of a user who does not have actual test score data may be converted into an actual test score (step 330).

More specifically, for other users without external test score data, when a user model is calculated with sufficient reliability in step 310, the user model may be used to predict the probabilities of right answer to the problems included in the problem database. In addition, applying the predicted right probability to the modeling function may convert the right probability into an external test score.

Then, assuming that any user selects any example of any problem (step 340), the user model and the problem model will be changed slightly with application of an example selection event of the user, the rate of right answer to each problem will be changed slightly depending on the changed model, and the predicted value of the actual test score converted by applying the modeling function will also be changed (step 350).

That is, the service server may assume that a relevant user selects an example of each of the problems included in the entire problem database, calculate change values of actual test score prediction, and calculate the total of the change values of actual test score prediction or the average of the change values as learning efficiency in the relevant problem.

Meanwhile, according to another embodiment of the present invention, using actual test score data of a user group, that is, the user group in which the actual test score data exists (step 320), a mock test problem set may be configured from the problem database such that the estimated score of the user group is similar to the actual test score data (a more specific method of constructing the mock test problem set will be described later).

The mock test problem set is characterized in that it is configured based on whether the estimated score is similar to the actual test score, unlike the conventional mock test configured by the expert with the same problem type as the actual test.

When mock test problem set is configured, the estimated score for the mock test problem set may be calculated using a user model of a user who does not belong to the user group (step 330). Since the mock test problem set is configured such that the estimated score is similar to the actual test score, the estimated score for the mock test problem set of users who do not have the actual test score data may be replaced with the predicted value of the actual test score.

Then, assuming that any user selects any example of any problem (step 340), the user model and the problem model will be changed slightly with application of an example selection event of the user, the rate of right answer to each problem will be changed slightly depending on the changed model, and the estimated score for the mock test problem set will also be changed (step 350).

That is, the service server may assume that a relevant user selects an example of each of the problems included in the entire problem database, calculate change values of actual test score prediction (i.e., estimated score for the mock test problem set), and calculate the total of the change values of actual test score prediction or the average of the change values as learning efficiency in the relevant problem.

Then, the service server may sort the problem database in the order of a high rate of increase in the actual test score prediction value and recommend it to the user (step 360).

Meanwhile, the process of calculating the modeling function that represents the relationship between the probability of right answer to each of the problems included in the problem database and the external test score is as follows.

As described above, the data analysis server may check a user group, in which external test score data exists, among all users. This is to configure a problem set with high efficiency of external test score prediction, using the relationship between the external test score data of the user group and the right probability obtained from each user model and the problem-example model.

Furthermore, the data analysis server according to the embodiment of the present invention may divide a portion of the user group into test groups to check the performance of the problem set, that is, to check whether the problem set has high predictive efficiency of the external test score or to check the performance of the modeling function that converts the score of the problem set into an external test score.

For example, if the users with external test data among all users belonging to the database are {A, B, C, D, E, F, G, H}, the data analysis server may classify {A, B, C, D, E} into a training set and classify {F, G, H} into a test set.

More specifically, the data analysis server may divide the user group with external test score data into any two groups, of which one is grouped into a training set that provides the data analysis framework with data for configuring the problem set and the test score transformation modeling function and the other is grouped into a test set that provides data for checking the performance of the problem set and modeling function.

In other words, among the user group in which the external test score data exists, the data of the users belonging to the training set may be used to configure the problem set and the test score transformation modeling function, and the data of the users belonging to the test set may be used to check the performance of the problem set and modeling function.

Then, the data analysis server may configure a problem set with high efficiency of external test score prediction from the problem database using the external test score data of the user group and the user modeling vector.

Particularly, the problem set according to the embodiment of the present invention is characterized in that it is not configured based on the similarity to the external test like the conventional mock test, but is configured based on whether the predictive efficiency of the external test score is high so that the number of problems and/or problem types do not need to be subject to the external test.

More specifically, for each problem included in the problem database, the data analysis server may represent the relationship between the right probability calculated using the modeling vector of the user group with external test score data and the external score data of the user group in a multidimensional plane.

For example, if the problems included in the problem database are 100, the data analysis server may generate a multidimensional plane by generating 100 x-axes as the number of problems and configuring the y-axis as an external test score.

For example, if five users belonging to the training set, among the users with external test score data, are A, B, C, D, and E, the data analysis server may calculate a probability of right answer to the first problem using the modeling vector calculated in advance for user A, set it to the x value of a first x-axis x1, and set the external test score of user A to a y value, to determine the coordinates of the first plane of the user A.

The data analysis server may determine the coordinates of the first plane of user B to user E in the same manner to represent the relationship with the external test score of the first problem x1 in the x1 plane of the multidimensional space.

Furthermore, the data analysis server may form planes for second to 100th problems in the same manner and determine the (x, y) coordinates of users A to E for each problem plane to represent the relationship with the external test scores of the second to 100th problems in the multidimensional space.

In this case, the estimated right probability and the external test scores for the individual problems of the user group will be substantially represented in the two-dimensional plane, and the data analysis server according to the embodiment of the present invention may change them to a modeling function that mathematically represents the relationship between the values represented in the two-dimensional plane.

For example, the data analysis server according to the embodiment of the present invention may calculate a modeling function f1(x1) that mathematically represents the relationship between external test scores of users A, B, C, D, and E belonging to the training set and a probability of right answer to a first problem calculated using user modeling vectors of users A, B, C, D, and E.

Furthermore, modeling functions f1(x2) to f1(x100) may be obtained by processing data for the second to 100th problems in the same manner. In this case, f1(x1) to f1(x100) should be determined according to the same criteria.

That is, the form of the modeling function calculated to configure the problem set is appropriately determined to be the same form for the entire problem belonging to the database. For example, if the modeling function f1(x1) of the first problem is represented as a one-dimensional function in the form of ax+b, it will be appropriate that the modeling functions f1(x2) to f1(x100) of the second to 100th problems are also represented in the form of a one-dimensional function.

This is because the problem set is composed of problems which are highly efficient in external test score prediction among problems belonging to the problem database, and therefore the comparison criteria must be identical.

Furthermore, the modeling function according to the embodiment of the present invention is not limited in form if the same criterion is applied to the entire problem. That is, the modeling function is sufficient if it is established in an optimized form to represent the data of the training set, and may be calculated according to various algorithms applied in the related art.

If the modeling function for each problem is determined to be the same for the entire problem, the data analysis server according to the embodiment of the present invention may configure a problem set with high efficiency of external test score prediction using the modeling function of the relevant problem and the deviation of the user's external test score belonging to the test set.

For example, the data analysis server may calculate the average of the value obtained by applying the probability of right answer to the first problem x1 calculated using the user modeling vectors of users F, G, and H belonging to the test set to the modeling function f(x1) of the first problem and the value of difference between the external test scores of users F, G, and H, and may determine that the external test score prediction efficiency is high if the average value e is small.

Equation for obtaining the average value e is as follows, and e may refer to an external test score estimation efficiency of the problem set. More specifically, the smaller the e value, the higher the external test score estimation efficiency of the problem set may be interpreted.

$$e_1 = (|y_F - f(x_{1F})| + |y_G - f(x_{1G})| + |y_H - f(x_{1H}H)/3 \quad \text{[Equation 6]}$$

Then, the data analysis server may calculate e2 to e100 according to the same criteria, and may determine that the problem having the smallest e has the highest efficiency of external test score prediction.

For example, if e4 for the fourth problem is smaller than e1, e2, e3, e5 to e100, it may be determined that the fourth problem has the highest efficiency of external test score prediction. Therefore, the data analysis server may initially include the fourth problem in the problem set.

Then, the data analysis server may extract a problem with high efficiency of external test prediction from among the first, second, third, and fifth to 100th problems on the premise that it is analyzed together with the fourth problem.

To this end, the data analysis server according to the embodiment of the present invention may fix a plane for the fourth problem and form planes for the remaining first, second, third, and fifth to 100th problems, to again calculate modeling functions f(x4, x1), f(x4, x2), f(x4, x3), f(x4, x5) to f(x4, x100) that mathematically represent the relationship between external test scores of users A, B, C, D, and E belonging to the training set and a probability of right answer to the remaining first, second, third and fifth to 100th problems calculated using the user modeling vectors of users A, B, C, D, and E (second modeling function).

The value of the second modeling function may be interpreted as an external test score estimation value for the fourth problem and the relevant problem.

In this case, the above two-dimensional modeling functions f(x4, x1), f(x4, x2), f(x4, x3), f(x4, x5) to f(x4, x100) should be determined according to the same criteria as when configuring the modeling function with only the fourth problem.

That is, for example, the modeling function f(x4, x1) of the first problem provided with the fourth problem is in the form of cx4+dx1+e, and should be represented as a two-dimensional function that increases only the dimension by adding a variable of x1 while following the standard of the linear model as in the form of ax4+b of the existing f(x4). The modeling functions f2(x4, x2), f2(x4, x3), f2(x4, x5) to f2(x4, x100) for the second, third, fifth to 100th problems provided with the fourth problem are also the same linear model as the existing f(x4), and will be appropriately represented in the form of a two-dimensional function to which each problem x is added as a variable.

On the premise that the fourth problem is included in the problem set, if the two-dimensional modeling function for the remaining problem is determined, the data analysis server according to the embodiment of the present invention may configure a problem set with high efficiency of external test score prediction using the two-dimensional functions of the relevant problems and the deviation of the user's external test score belonging to the test set.

For example, the data analysis server may calculate the average of the values obtained by applying the probabilities of right answer to the first problem x1 and the fourth problem x4 calculated using the user modeling vectors of users F, G, and H belonging to the test set to the two-dimensional modeling function f(x4, x1) (this will be interpreted as the external test score estimation values of the fourth and first problems) and the value of difference between the external test scores of users F, G, and H, and may determine that the external test score prediction efficiency is high if the average value is small. This is represented by Equation below.

$$e_{4,1} = (|y_F - f(x_{4F}, x_{1F})| + |y_G - f(x_{4F}, x_{1G})| + |y_H - f(x_{4H}, x_{1H})|)/3 \quad \text{[Equation 7]}$$

Then, the data analysis server may calculate e4,2 to e4,100 according to the same criteria, and may determine that the problem having the smallest e has the highest efficiency of external test score prediction.

For example, if e4,1 for the first problem is smaller than e4,2, e4,3, e4,5 to e4,100, it may be determined that the first problem has the highest efficiency of external test score prediction since it is provided with the fourth problem. Therefore, the data analysis server may include the first problem in the problem set.

Then, the data analysis server may extract a problem with high efficiency of external test prediction from among the second, third, and fifth to 100th problems, on the premise that it is analyzed together with the first and fourth problems, according to the same logic as the above-mentioned method.

On the other hand, when the problem set is composed of problems having a minimum e by the above method, the completion point of the problem set configuration may be problematic. The larger the number of problems included in the problem set, the higher the accuracy of the estimation. However, the resource usage required to calculate the modeling function for each problem and calculate the priority may be increased to configure the problem set. Therefore, it is efficient to configure a problem set with the number of problems optimized for external test score estimation.

According to the embodiment of the present invention, it is possible to calculate the average of the value obtained by applying the probability of right answer to a problem set calculated using the modeling vectors of the users belonging to the test set to the modeling function of the problem set and the value of difference between the external test scores of the users belonging to the test set, i.e., e, and to determine whether or not to terminate the problem set configuration according to the change trend of e according to the update of the problem set.

The data analysis server according to the embodiment of the present invention may determine whether or not to terminate the problem set update by checking the update trend of e of the problem set. More specifically, there may be two major considerations when terminating the problem set update.

The first is when the problem set at that time is enough to estimate the external test scores of the users in the test group. That is, the external test score estimation may be sufficiently performed with only a specific problem set. This may be determined by checking whether e of the problem set at that time is less than or equal to a threshold.

The second is when the efficiency of external test score estimation is not increased any longer even though another problem is added to the problem set. That is, there is no effect of adding a problem, and it is expected that there will be no change in the efficiency of external test score estimation even though a problem is added. This may be determined by checking whether the efficiency of the update problem set estimation, i.e., e, remains unchanged and remains within any range despite the update of the problem set.

In summary, the data analysis server according to the embodiment of the present invention may configure the problem set by checking the external test score estimation efficiency of the problem set, that is, the change trend of e, while performing the update of the problem set, and terminating the update of the problem set when the estimation efficiency of the problem set at a specific point in time falls below a preset threshold or when the estimation efficiency is maintained within any range.

Meanwhile, the modeling function according to the embodiment of the present invention may be determined according to various algorithms on the premise that it is the same form for the problems included in the problem set. However, for solving a technical problem, it may be necessary to select the most efficient function for estimating the external test score, from among a plurality of modeling functions generated by applying various algorithms.

According to the embodiment of the present invention, the efficiency of the modeling function may be calculated using e, i.e., the external test score prediction efficiency of the problem set.

For example, a first modeling function f1 may be extracted according to a first criterion using the data of the user belonging to the training set {A, B, C, D, E}, and a problem set {third problem x3, fourth problem x4, fifth problem x5} configured by applying the first modeling function may be considered.

Furthermore, a second modeling function f2 may be extracted according to a second criterion using the data belonging to the same training set {A, B, C, D, E}, and a problem set {first Problem x1, third problem x3, fifth problem x5} configured by applying the second modeling function is may be considered.

In the above example, the data analysis server according to the embodiment of the present invention may calculate e, i.e., the efficiency of the external test score prediction efficiency of each problem set and each modeling function using the data of the test set {F, G, H}, and select a modeling function with a smaller value of e.

More specifically, the data analysis server may first calculate the average of the value obtained by applying the probability of right answer to the first problem set {third problem x3, fourth problem x4, fifth problem x5} to the first modeling function f1 using the user modeling vectors of users F, G, and H belonging to the test set and the value of difference between the external test scores of users F, G, and H, that is, e1 for the first modeling function.

Then, the data analysis server may calculate the average of the value obtained by applying the probability of right answer to the second problem {first problem x1, third problem x3, fifth problem x5} to the second modeling function f2 using the user modeling vectors of users F, G, and H belonging to the test set and the value of difference between the external test scores of users F, G, and H, that is, e2 for the second modeling function.

Then, the data analysis server may select a modeling function and a problem set having a smaller value of e and perform the subsequent procedure of estimating the user's external test score.

Meanwhile, the process of configuring a mock test set so that the estimated score of the user is similar to the presented actual test score data without using the problem database is as follows.

According to the embodiment of the present invention, the mock test may be configured in the following manner.

The first method is to configure a problem set so that the average score of the mock test for all users is within any range using the average right rate of all users for each database problem.

For example, when referring to the statistics of the language proficiency test, if the average score of all examinees for a relevant test is 67 to 69, the data analysis server may configure a problem set so that the average score of the mock test is within the range of 67 to 69.

In this case, the problem set of the mock test may be configured by taking into account the distribution of problem types in the relevant test. For example, when referring to the statistics of the language proficiency test, if the actual test has about 20% of a first type, about 30% of a second type, about 40% of a third type, and about 10% of a fourth type, the mock test may also be configured such that the distribution of problem types is similar to the actual test.

To this end, according to the embodiment of the present invention, index information may be added to the problem database by generating labels for problem types in advance.

For example, the data analysis server may generate index information by predefining labels for problems that may be classified into any type, learning the characteristics of the problem model that follow the relevant problem type to cluster problems, and assigning the labels for the problem types to the clustered problem group.

As another example, the data analysis server may also generate index information by clustering problems using the modeling vectors of the problems without predefining labels for problem types, and interpreting the meaning of the clustered problem group to assign the labels for the problem types thereto.

According to the embodiment of the present invention, the second method is to configure a mock test using the actual score information of any users for a relevant test.

For example, in the previous example of the language proficiency test, if the actual scores of users A, B, and C who took the relevant test are 60, 70, and 80, respectively, a problem set of a mock test may be configured such that the estimated scores of the mock test calculated by applying the pre-calculated right rates of users A, B, and C are 60, 70, and 80, respectively.

According to the above embodiment in which the problem set is configured such that the estimated score of the mock test is close to the actual score, the similarity between the mock test and the actual test may be mathematically calculated using the score information of the user who took the actual test. Therefore, it is possible to increase the reliability of the mock test, that is, the reliability that the mock test score is close to the actual test score.

In this case, according to the embodiment of the present invention, it is possible to configure a problem set of a mock test by applying the problem type distribution information of the relevant test or by applying other information that is statistically analyzed.

Meanwhile, the data analysis server may adjust the distribution of marks for problems in the course of configuring a mock test problem set. This is because separate scoring information is not assigned to the problems belonging to the problem database, but different points are assigned to each of the problems of the actual test.

In general, an actual test is configured such that a high point is assigned to a difficult problem and a low point is assigned to an easy problem. In this analysis, the actual problem is scored in consideration of the average rate of right answer to the problem, the number of concepts configuring the problem, the length on the problem print, and the like, and a pre-specified point may be assigned according to the type of problems.

Therefore, the data analysis server according to the embodiment of the present invention may assign a point to each of the constituent problems of the mock test problem set by reflecting at least one of the average rate of right answer to the problem, the number of concepts configuring the problem, the length on the problem print, and the problem type information.

To this end, the data analysis server may list the learning elements and/or subjects of the relevant subject in a tree structure to generate a label for the concept of the problem and generate a metadata set for the minimum learning elements, and may classify the minimum learning elements into group units suitable for analysis to generate index information on the concept constituting the problem.

Particularly, according to the embodiment of the present invention, a point may be assigned to each of the problems constituting the problem set such that the actual scores of the users who actually take the test are close to the estimated scores for the mock test problem set of the users.

When a mock test problem set with high similarity to the actual test is configured, the data analysis server according to the embodiment of the present invention may estimate the predicted score of the user for each mock test. On the premise that the actual test is similar to the mock test, the score of the mock test is estimated as the score of the actual test.

Particularly, the embodiment of the present invention is characterized in that the user may estimate the score of the mock test with high reliability without directly solving the mock test.

The mock test according to the embodiment of the present invention is composed of the problems included in the problem database, and the user's rate of right answer to each of the problems belonging to the database is calculated in advance as described above. Thus, it is possible to estimate the mock test prediction score of the user using the rate of right answer of the individual user for all problems constituting the mock test.

In this case, according to the embodiment of the present invention, it is possible to configure a plurality of mock test problem sets for estimating any test score, and to average the estimated scores of specific users for a plurality of mock tests to estimate the predicted scores of the users for the actual test.

The embodiments disclosed in the specification and drawings are only illustrative of the present invention for the purpose of facilitating the explanation and understanding of the present invention, and are not intended to limit the scope of the present invention. It will be apparent to those skilled in the art that other modifications based on the technical idea of the present invention are possible in addition to the embodiments disclosed herein.

The invention claimed is:

1. A method of analyzing a user in a server, comprising:
   a) for a specific subject, configuring, using the server, a problem database comprising one or more multiple-choice problems, providing, using the server, at least one problem of the one or more multiple choice problems to user devices, collecting, using the server, one or more selected answers of users for the at least one problem from the user devices, and storing, using the server, the one or more selected answers of the users for the at least one problem in the problem database, wherein the users and the one more multiple choice problems are stored as modeling vectors in a machine learning framework;
   b) estimating, using the server and modeling vectors in the machine learning framework, a probability of a right answer to the at least one problem for each of the users using values stored in a multidimensional plane;
   c) for the specific subject, analyzing, using the server, external test score data of a first user group, wherein the external test score data is associated with an external test that is external to the one or more multiple-choice questions contained within the problem database, and generating, using the server, a mock test problem set from the one or more multiple-choice problems in the problem database to predict an external test score of at least one second group user of a second user group which has not taken the external test, wherein the mock test problem set is generated by collecting one or more mock test problems from the one or more multiple-choice problems that are predicted to result in similar mock test score data as the external test score data of the first user group; and
   d) estimating, using the server, a predicted mock test score of the mock test problem set for the at least one second group user of the second user group without providing the mock test problem set to the at least one second group user of the second user group, and estimating, using the server, the predicted mock test score of the mock test problem set as a predicted external test score for the external test.

2. The method according to claim 1, comprising, after estimating the predicted external test score, calculating, for each multiple-choice problem of the one or more multiple choice problems, a rate of increase or decrease in the predicted external test score for the external test estimated for the at least one second group user of the second user group, and sorting each multiple-choice problem of the one or more multiple choice problems contained in the problem database in an order to increase the predicted external test score for the external test to recommend them to the at least one second group user.

3. The method according to claim 2, wherein the d) estimating the predicted external test score comprises:
   calculating a modeling function that represents a relationship between the mock test problem set of the first user group from the one or more multiple-choice problems contained in the database and the external test score data of the first user group; and
   estimating the predicted external test score using the modeling function.

4. The method according to claim 1, wherein generating the mock test problem set further comprises generating the mock test problem set such that an average score of the mock test problem set for all first group users falls within a preset range, using an average rate right answers to each mock test problem of the mock test problem set for all the first group users.

5. The method according to claim 1, wherein generating the mock test problem set further comprises generating the mock test problem set to follow problem type distribution information of the external test.

6. A method of analyzing a user in a server, comprising:
   a) for a specific subject, configuring, using the server, a problem database comprising one or more multiple-choice problems, providing, using the server, at least one problem of the one or more multiple choice problems to user devices, collecting, using the server, one or more selected answers of users for the at least one problem from the user devices, and storing, using the server, the one or more selected answers of the users for the at least one problem in the problem database, wherein the users and the one more multiple choice problems are stored as modeling vectors in a multidimensional plane for a machine learning framework;
   b) estimating, using the server and the machine learning framework, a probability of a right answer to the at least one problem for each of the users using the modeling vectors;
   c) for the specific subject, analyzing, using the server and the machine learning framework, external test score data of a first user group, wherein the external test score data is associated with an external test that is external to the one or more multiple-choice questions contained within the problem database, and generating, using the server and the machine learning framework, a mock test problem set from the one or more multiple-choice problems in the problem database to predict an external test score of at least one second group user of a second user group which has not taken the external test, wherein the mock test problem set is generated by collecting one or more mock test problems from the one or more multiple-choice problems that are predicted to result in similar mock test score data as the external test score data of the first user group; and d) estimating, using the server and the machine learning framework, a predicted mock test score of the mock test problem set for the at least one second group user of the second user group without providing the mock test problem set to the at least one second group user of the second user group, and estimating, using the server and the machine learning framework, the predicted mock test score of the mock test problem set as a predicted external test score for the external test.

* * * * *